US008035661B2

United States Patent
Lee et al.

(10) Patent No.: US 8,035,661 B2
(45) Date of Patent: Oct. 11, 2011

(54) DRIVING APPARATUS OF DISPLAY DEVICE FOR GRAY RANGE EXTENSION, DISPLAY DEVICE INCLUDING THE SAME, AND METHOD OF DRIVING DISPLAY DEVICE FOR GRAY RANGE EXTENSION

(75) Inventors: Il-Pyung Lee, Suwon-si (KR); Cheol-Woo Park, Suwon-si (KR); Jae-Byung Park, Seongnam-si (KR); Hak-Gyu Kim, Daegu (KR); Min-Gu Lee, Yongin-si (KR); Sung-Gu Lee, Pohang-si (KR); Ung-Jin Jang, Daejeon (KR)

(73) Assignees: Samsung Electronics Co., Ltd. (KR); Postech Academy-Industry Foundation (KR)

( * ) Notice: Subject to any disclaimer, the term of this patent is extended or adjusted under 35 U.S.C. 154(b) by 973 days.

(21) Appl. No.: 11/953,130

(22) Filed: Dec. 10, 2007

(65) Prior Publication Data
US 2008/0246779 A1 Oct. 9, 2008

(30) Foreign Application Priority Data
Apr. 3, 2007 (KR) .................. 10-2007-0032905

(51) Int. Cl.
*G09G 5/10* (2006.01)
*G09G 3/36* (2006.01)
*G06K 9/00* (2006.01)
*G06K 9/40* (2006.01)

(52) U.S. Cl. ........... 345/690; 345/89; 382/169; 382/274

(58) Field of Classification Search .............. 345/63, 345/77, 89, 95, 98–101, 204, 210, 690, 694; 382/168–169, 263–264, 270–274
See application file for complete search history.

(56) References Cited

U.S. PATENT DOCUMENTS

| 7,127,123 | B2 * | 10/2006 | Wredenhagen et al. | 382/274 |
| 7,609,886 | B2 * | 10/2009 | Kao et al. | 382/169 |
| 7,646,512 | B2 * | 1/2010 | Hsieh et al. | 358/3.01 |
| 2004/0207589 | A1 | 10/2004 | Kim et al. | |
| 2005/0002565 | A1 | 1/2005 | Han et al. | |
| 2005/0031200 | A1 * | 2/2005 | Lee et al. | 382/169 |
| 2005/0147293 | A1 | 7/2005 | Lee et al. | |
| 2005/0265599 | A1 * | 12/2005 | Huang et al. | 382/169 |
| 2006/0082689 | A1 | 4/2006 | Moldvai | |

(Continued)

FOREIGN PATENT DOCUMENTS
JP 2003046779 2/2003
(Continued)

*Primary Examiner* — Bipin Shalwala
*Assistant Examiner* — Keith Crawley
(74) *Attorney, Agent, or Firm* — Cantor Colburn LLP

(57) ABSTRACT

The driving apparatus of a display device calculates a slope using a minimum gray, a maximum gray, a gray average of frame data in a current frame, and a gray average of frame data in a previous frame, and corrects and outputs the input frame data according to the slope, using frame data of one frame. As a result, a gray range of the input image signal can be extended, thereby improving visibility. Further, in a case of a motion picture, even when a difference of a gray range of images of adjacent frames is large, an original image is not distorted due to extension of a gray range. Also, even when noise is included in the input image signal, a gray range can be extended after removing the noise.

16 Claims, 7 Drawing Sheets

U.S. PATENT DOCUMENTS

2008/0062101 A1 * 3/2008 Minami et al. .................. 345/89

FOREIGN PATENT DOCUMENTS

| JP | 2005160015 | 6/2005 |
|---|---|---|
| JP | 2005184787 | 7/2005 |
| JP | 2005196108 | 7/2005 |
| KR | 1020040006065 A | 1/2004 |
| KR | 1020040064950 A | 7/2004 |
| KR | 1020050017813 A | 2/2005 |
| KR | 1020050104890 A | 11/2005 |
| KR | 1020060095203 A | 8/2006 |
| KR | 1020060112598 A | 11/2006 |

* cited by examiner

| 1/256 | 1/256 | 1/256 | 1/256 | 1/256 | 1/256 | 1/256 |
|---|---|---|---|---|---|---|
| 1/256 | 4/256 | 4/256 | 4/256 | 4/256 | 4/256 | 1/256 |
| 1/256 | 4/256 | 16/256 | 16/256 | 16/256 | 4/256 | 1/256 |
| 1/256 | 4/256 | 16/256 | 40/256 (0) | 16/256 | 4/256 | 1/256 |
| 1/256 | 4/256 | 16/256 | 16/256 | 16/256 | 4/256 | 1/256 |
| 1/256 | 4/256 | 4/256 | 4/256 | 4/256 | 4/256 | 1/256 |
| 1/256 | 1/256 | 1/256 | 1/256 | 1/256 | 1/256 | 1/256 |

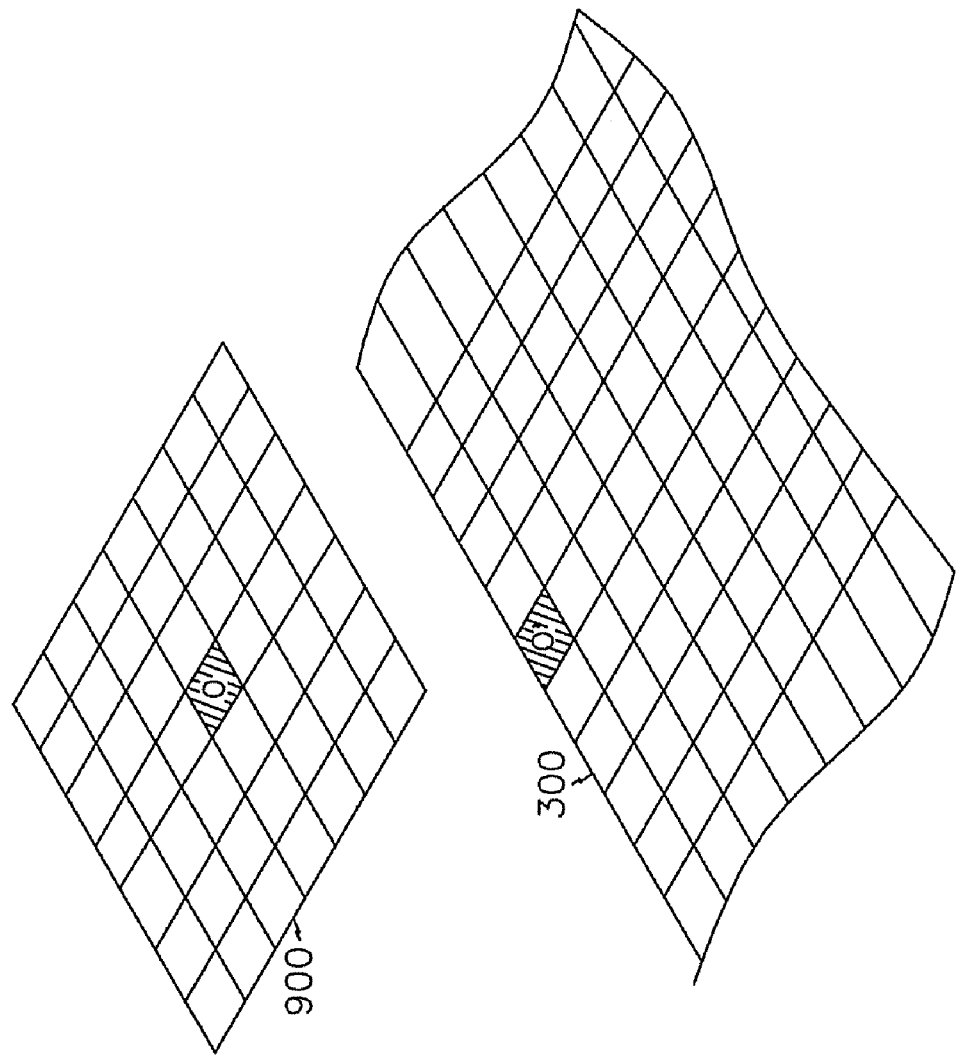

DRIVING APPARATUS OF DISPLAY DEVICE FOR GRAY RANGE EXTENSION, DISPLAY DEVICE INCLUDING THE SAME, AND METHOD OF DRIVING DISPLAY DEVICE FOR GRAY RANGE EXTENSION

This application claims priority to Korean Patent Application No. 10-2007-0032905, filed on Apr. 3, 2007, and all the benefits accruing therefrom under 35 U.S.C. §119, the contents of which in its entirety are herein incorporated by reference.

BACKGROUND OF THE INVENTION (a) Field of the Invention

The present invention relates to a driving apparatus of a display device, a display device including the same, and a method of driving the display device. More particularly, the present invention relates to a driving apparatus of a display device improving visibility thereof, a display device including the same, and a method of driving the display device.

(b) Description of the Related Art

Currently, instead of a heavy and large cathode ray tube ("CRT"), a flat panel display such as an organic light emitting diode ("OLED") display, a plasma display panel ("PDP"), and a liquid crystal display ("LCD") are being actively developed.

The PDP is a device for displaying a character or an image using plasma generating by a gas discharge, and the OLED display displays a character or an image using electric field light emitting of a specific organic material or polymer. The LCD adjusts transmittance of light passing through a liquid crystal layer by applying an electric field to a liquid crystal layer that is interposed between two display panels and adjusting intensity of the electric field, thereby obtaining a desired image.

The flat panel display has a signal controller for processing a signal in order to display an image. The signal controller changes an image in an appropriate form to display an image in a display device by processing the input image signal.

In this case, it is usual that an image signal of every frame that is input to the signal controller does not use all grays that can be displayed, and a gray range is also limited to a predetermined range. Further, when a displayed gray range inclines to one side, an image is displayed dark or bright, whereby visibility is lowered.

Particularly, in a case of a motion picture, because such a dark image and bright image can be alternatively displayed within a short time period, it is difficult to recognize an image.

BRIEF SUMMARY OF THE INVENTION

Exemplary embodiments of the present invention provide a driving apparatus of a display device, the driving apparatus including a gray range calculation unit which calculates a minimum gray and a maximum gray of a current image signal, which is an image signal of a current frame, or a signal that filters the current image signal with a low band, a conversion variable calculation unit which calculates a conversion variable based on the minimum gray, the maximum gray, a gray average of a current image signal, and a gray average of a previous image signal, which is an image signal of a previous frame, and an output signal generator which generates an output image signal by converting the current image signal according to the conversion variable.

Conversion may be linear conversion that uses the conversion variable as a slope. The slope may change according to a slope of the previous image signal.

The slope Sc may be given by $$Sc = \left(1 - \left|\frac{AGc - AGp}{G\max}\right|\right) \times Sp + \left|\frac{AGc - AGp}{G\max}\right| \times \frac{G\max}{\text{Max} - \text{Min}},$$

where AGc is a gray average of a current frame, AGp is a gray average of a previous frame, Gmax is a maximum gray that can be displayed, Sp is a slope of the previous frame, Max is a maximum gray value of the current frame, and Min is a minimum gray value of the current frame.

The slope Sc may have a value of about 1 to about 2.5.

The conversion may be defined by $D' = (D - \text{Min})Sc + c$, where D is a current image signal, D' is an output image signal, and c is a constant. The constant c may be identical to the gray minimum value of the current frame Min.

Low band filtration may include correcting a current image signal of each pixel in consideration of a current image signal of an adjacent pixel.

The conversion variable calculation unit may include an average gray calculation unit which calculates a gray average of a image signal, a first memory which stores the gray average, an α-value calculation unit which calculates an α-value by dividing a difference between a gray average of the current image signal and a gray average of the previous frame with a maximum gray value that can be displayed, a basic slope computation unit which computes a basic slope in which a maximum gray that can be displayed is divided by a difference between the maximum gray and the minimum gray, a slope computation unit which computes a basic slope, a slope of the previous image signal, and a slope of the current image signal based on the α-value, and a second memory which stores a slope that is computed in the slope computation unit and provides a slope of the previous image signal to the slope computation unit.

The output signal generator may include a frame memory which stores the current image signal, and a data correction unit which generates an output image signal by linearly converting the current image signal that is received by the frame memory according to the slope that is received from the slope computation unit.

The gray range calculation unit may include a low band filter which removes noise by filtering the current image signal with a low band, and a minimum gray and maximum gray calculation unit which calculates the minimum gray and the maximum gray of the current image signal that passes through the low band filter. The low band filter may correct a current image signal of each pixel by providing and adding a predetermined weight to a current image signal of a pixel adjacent to the current image signal of each pixel.

Other exemplary embodiments of the present invention provide a method of driving a display device, including calculating a minimum gray and a maximum gray of a current image signal, which is an image signal of a current frame, calculating a gray average of the current image signal, calculating a slope based on the minimum gray, the maximum gray, the gray average of a current image signal, and a gray average of a previous image signal, which is an image signal of a previous frame, and linearly converting the current image signal based on the slope.

Calculating the slope may include calculating an α-value in which a difference between the gray average of the current image signal and the gray average of the previous image signal is divided by a maximum gray value that can be displayed, computing a basic slope in which the maximum gray value is divided by a difference between the maximum gray and the minimum gray, and calculating the slope based on the α-value, the basic slope, and a slope of the previous image signal.

The slope Sc may be given by Sc=1−α×Sp+α×Sb, where Sp is the slope of a previous frame and Sb is the basic slope.

Linearly converting may satisfy D'=(D−min)Sc+c, where D is the current image signal, D' is an output image signal, min is the minimum gray, and c is a constant. The constant c may be identical to the minimum gray min.

The method may further include removing noise existing in the current image signal before calculating the minimum gray and the maximum gray. Removing noise may include removing noise of each current image signal by providing and adding a weight to an image signal adjacent to each current image signal.

Yet other exemplary embodiments of the present invention provide a display device including a signal controller which generates an output image signal by correcting a current image signal, which is an image signal of a current frame, based on a gray average, a minimum gray, and a maximum gray of the current image signal, and a gray average of a previous image signal, which is an image signal of a previous frame, and which generates an output image signal, a data driver which converts the output image signal to a data voltage, and a display panel which receives the data voltage to display an image.

The signal controller may linearly convert the current image signal to the output image signal based on a slope Sc that is calculated based on the minimum gray, the maximum gray, the gray average of the current image signal, and the gray average of the previous image signal. The slope Sc may change according to a slope of the previous image signal.

The slope Sc may be given by $$Sc = \left(-\left|\frac{AGc - AGp}{G\max}\right|\right) \times Sp + \left|\frac{AGc - AGp}{G\max}\right| \times \frac{G\max}{\text{Max} - \text{Min}},$$

where AGc is the gray average of the current frame, AGp is the gray average of the previous frame, Gmax is a maximum gray that can be displayed, Sp is the slope of the previous image signal, Max is the maximum gray value of the current frame, and Min is the minimum gray value of the current frame.

Conversion may be defined by D'=(D−min)Sc+min, where D is the current image signal and D' is the output image signal.

BRIEF DESCRIPTION OF THE DRAWINGS

Exemplary embodiments of the present invention can be understood in more detail from the following descriptions taken in conjunction with the accompanying drawings, in which.

DETAILED DESCRIPTION OF THE INVENTION

Figure 1:
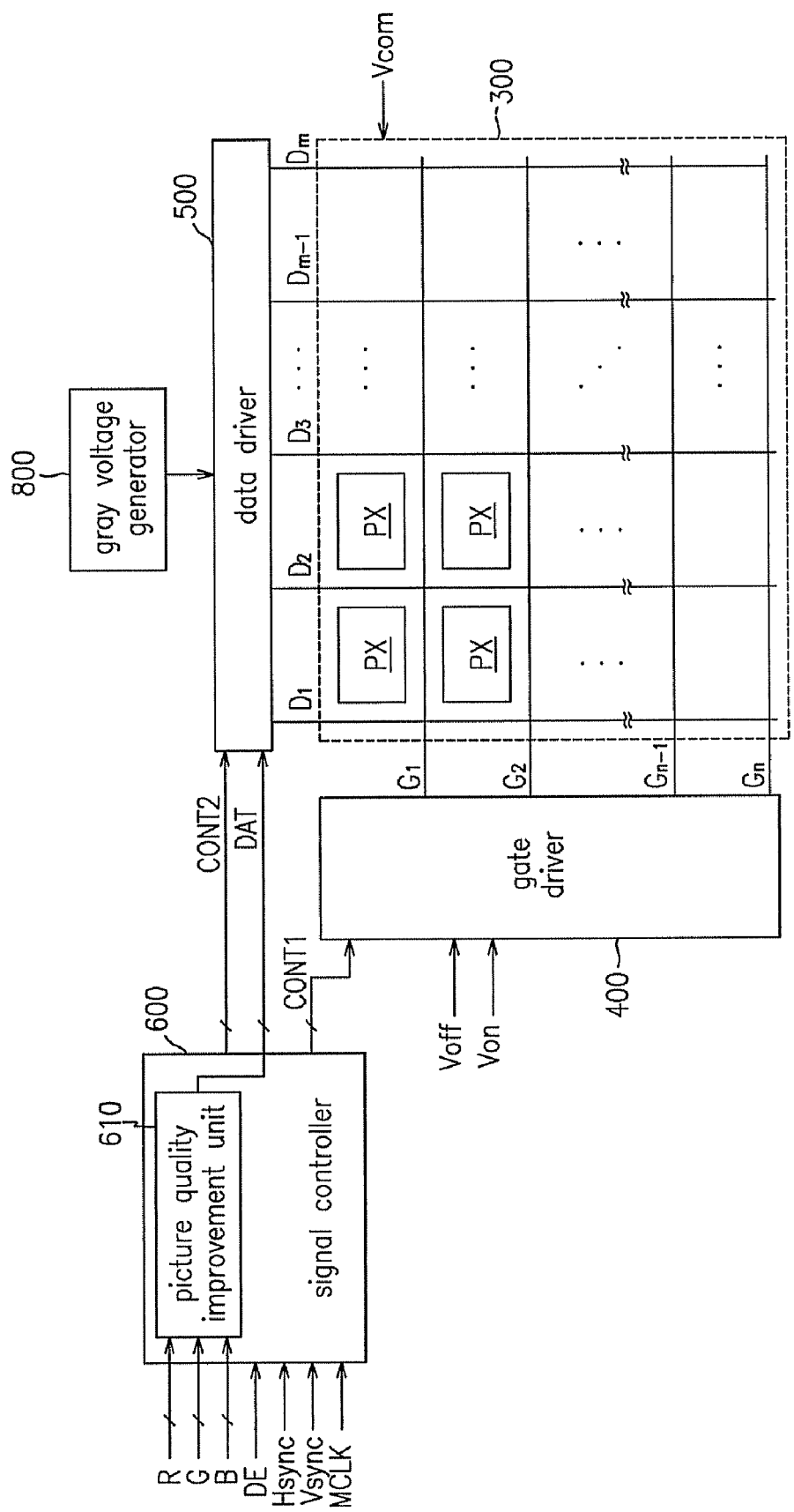
FIG. 1 is a block diagram of an exemplary liquid crystal display ("LCD") according to an exemplary embodiment of the present invention.

The present invention provides a driving apparatus of a display device, a display device including the same, and a method of driving the display device having advantages of improving visibility by extending a gray range of an input image signal. The present invention further provides a driving apparatus of a display device, a display device including the same, and a method of driving the display device having advantages of, in a case of a motion picture, preventing distortion of an image from being generated due to extension of a gray range even when a difference of the gray range between images of adjacent frames is large. The present invention further provides a driving apparatus of a display device, a display device including the same, and a method of driving the display device having advantages of extending a gray range after removing noise even when noise is included in an input image signal.

In the present invention, a gray range is extended using a gray average value of a previous frame, a gray average value of a current frame, a slope of the previous frame, and a minimum gray value and a maximum gray value of the current frame.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. Hereinafter, the present invention will be described in further detail with reference to the accompanying drawings.

Figure 2:
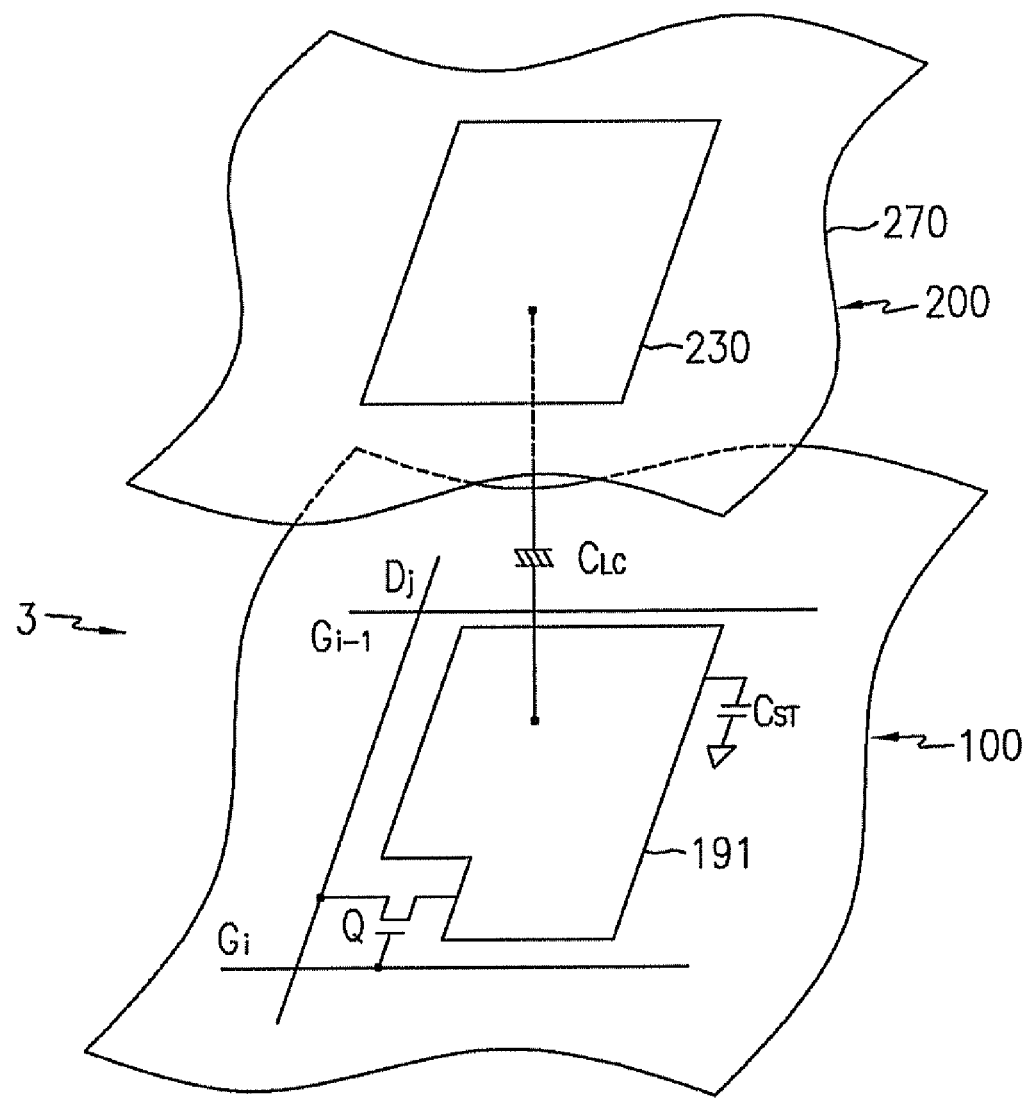
FIG. 2 is an equivalent circuit diagram of an exemplary pixel in an exemplary LCD according to an exemplary embodiment of the present invention.

First, referring to FIGS. 1 and 2, a liquid crystal display ("LCD") according to an exemplary embodiment of the present invention is described in detail.

FIG. 1 is a block diagram of an exemplary LCD according to an exemplary embodiment of the present invention, and FIG. 2 is an equivalent circuit diagram of an exemplary pixel in an exemplary LCD according to an exemplary embodiment of the present invention.

The LCD according to an exemplary embodiment of the present invention includes a liquid crystal panel assembly 300, a gate driver 400, a data driver 500, a gray voltage generator 800, and a signal controller 600. The signal controller 600 includes a picture quality improvement unit 610 for improving a picture quality.

Referring to FIG. 1, the liquid crystal panel assembly 300 includes a plurality of signal lines G1-Gn and D1-Dm and a plurality of pixels PX that are connected thereto and arranged in an approximate matrix form from an equivalent circuital view. The liquid crystal panel assembly 300 includes lower and upper panels 100 and 200 that are opposite to each other, and a liquid crystal layer 3 that is interposed therebetween from a structural view as shown in FIG. 2.

The signal lines G1-Gn and D1-Dm include a plurality of gate lines G1-Gn for transferring a gate signal (also referred to as a "scanning signal") and a plurality of data lines D1-Dm for transferring a data voltage. The gate lines G1-Gn extend approximately in a row direction, such as a first direction, and are almost parallel to each other, and the data lines D1-Dm extend approximately in a column direction, such as a second direction, and are almost parallel to each other. The first and second directions may be substantially perpendicular to each other.

Each pixel PX, for example a pixel PX that is connected to an i-th (i=1, 2, ..., n) gate line Gi and a j-th (j=1, 2, ..., m) data line Dj, includes a switching element Q that is connected to the signal lines Gi and Dj, and a liquid crystal capacitor Clc and a storage capacitor Cst that are connected thereto. In an alternative exemplary embodiment, the storage capacitor Cst may be omitted, as needed.

The switching element Q is a three terminal element such as a thin film transistor ("TFT") that is provided in the lower panel 100, and a control terminal thereof, such as a gate electrode, is connected to the gate line Gi, an input terminal thereof, such as a source electrode, is connected to the data line Dj, and an output terminal thereof, such as a drain electrode, is connected to the liquid crystal capacitor Clc and the storage capacitor Cst.

The liquid crystal capacitor Clc has a pixel electrode 191 of the lower panel 100 and a common electrode 270 of the upper panel 200 as two terminals, and the liquid crystal layer 3 between two electrodes 191 and 270 functions as a dielectric material. The pixel electrode 191 is connected to the output terminal of the switching element Q, and the common electrode 270 is formed on an entire surface, or substantially an entire surface, of the upper panel 200 and receives a common voltage Vcom. In an alternative exemplary embodiment, unlike a case of FIG. 2, the common electrode 270 may be provided in the lower panel 100, and in this case, at least one of two electrodes 191 and 270 may be formed in a line shape or a bar shape.

The storage capacitor Cst as an assistant of the liquid crystal capacitor Clc is formed with the overlap of a separate signal line (not shown), such as a storage electrode line, and the pixel electrode 191 that are provided in the lower panel 100 with an insulator interposed therebetween, and a predetermined voltage such as a common voltage Vcom is applied to the separate signal line. However, the storage capacitor Cst may be formed with the overlap of the pixel electrode 191 and a previous gate line Gi-1 directly on the electrode 191 via the insulator.

In order to represent the color display, by allowing each pixel PX to inherently display one color in a set of colors (spatial division) or to sequentially alternately display the set of colors (temporal division), a desired color is recognized with the spatial and temporal combination of the colors. An example of the set of colors may include primary colors, and may include red, green, and blue colors. FIG. 2 shows as an example of spatial division that each pixel PX is provided with a color filter 230 for displaying one of the colors in a region of the upper panel 200 corresponding to the pixel electrode 191. In an alternative exemplary embodiment, unlike the case of FIG. 2, the color filter 230 may be formed on or under the pixel electrode 191 of the lower panel 100.

At least one polarizer (not shown) is provided at the liquid crystal panel assembly 300. In an exemplary embodiment, a first polarized film (not shown) and a second polarized film (not shown) may be disposed on the lower panel 100 and upper panel 200, respectively. The first and second polarized films may adjust a transmission direction of light externally provided into the lower and upper panels 100, 200, respectively, in accordance with an aligned direction of the liquid crystal layer 3. The first and second polarized films may have first and second polarized axes thereof substantially perpendicular to each other.

Referring again to FIG. 1, the gray voltage generator 800 generates all gray voltages or a fixed number of gray voltages (hereinafter referred to as "reference gray voltages") that are related to transmittance of the pixels PX. The gray voltages may include voltages having a positive value and voltages having a negative value with respect to a common voltage Vcom.

The gate driver 400 is connected to the gate lines G1-Gn of the liquid crystal panel assembly 300 to apply a gate signal including a combination of a gate-on voltage Von and a gate-off voltage Voff to the gate lines G1-Gn.

The data driver 500 is connected to the data lines D1-Dm of the liquid crystal panel assembly 300 to select a gray voltage from the gray voltage generator 800 and to apply the gray voltage as a data voltage to the data lines D1-Dm. However, when the gray voltage generator 800 provides only a fixed number of reference gray voltages rather than providing all gray voltages, the data driver 500 generates a desired data voltage by dividing a reference gray voltage.

The signal controller 600 controls the gate driver 400 and the data driver 500 and includes the picture quality improvement unit 610 for increasing contrast. A detailed structure and operation of the picture quality improvement unit 610 will be further described below.

Each of the driving devices 400, 500, 600, and 800 may be directly mounted on the liquid crystal panel assembly 300 in at least one integrated circuit ("IC") chip form. Further, each of the driving devices 400, 500, 600, and 800 may be mounted on a flexible printed circuit ("FPC") film (not shown) to be attached to the liquid crystal panel assembly 300 in a form of a tape carrier package ("TCP"). Each of the driving devices 400, 500, 600, and 800 may be mounted on a separate printed circuit board ("PCB") (not shown). Alternatively, the driving devices 400, 500, 600 and 800 together with the signal lines G1-Gn and D1-Dm and the TFT switching element Q may be integrated with the liquid crystal panel assembly 300. Further, the driving devices 400, 500, 600, and 800 can be integrated in a single chip and in this case, at least one of them or at least one circuit element constituting them may be disposed at the outside of the single chip.

Now, the operation of the LCD will be further described.

The signal controller 600 receives input image signals R, G, and B and an input control signal for controlling the display of the input image signals R, G, and B from an external graphics controller (not shown). The input image signals R, G, and B contain luminance information of each pixel PX, and luminance has grays of a given number, for example, $1024(=2^{10})$, $256(=2^8)$, or $64(=2^6)$. In an exemplary embodiment of the present invention, an example having 256 grays is described. The input control signal includes, for example, a vertical synchronization signal Vsync, a horizontal synchronizing signal Hsync, a main clock signal MCLK, and a data enable signal DE.

The signal controller 600 appropriately processes the input image signals R, G, and B according to an operating condition of the liquid crystal panel assembly 300 based on the input image signals R, G, and B and the input control signal, and generates a gate control signal CONT1 and a data control signal CONT2 based on the input control signal. Thereafter, the signal controller 600 sends the gate control signal CONT1 to the gate driver 400 and sends the data control signal CONT2 and the processed digital image signal DAT to the data driver 500.

Particularly, and as will be further described below, the picture quality improvement unit 610 corrects the input image signals R, G, and B according to a minimum gray and a maximum gray of the input image signals R, G, and B and a properly defined conversion variable.

The gate control signal CONT1 includes a scanning start signal STV for instructing the scanning start and at least one clock signal for controlling an output period of a gate-on voltage Von. The gate control signal CONT1 may further include an output enable signal OE for limiting a sustain time of a gate-on voltage Von.

The data control signal CONT2 includes a horizontal synchronization start signal STH for notifying the transmission start of a digital image signal DAT for one row of pixels PX, and a load signal LOAD and a data clock signal HCLK for applying an analog data voltage to the data lines D1-Dm. The data control signal CONT2 may further include an inversion signal RVS for inverting polarity of a data voltage to a common voltage Vcom (hereinafter, "polarity of a data voltage to a common voltage" is referred to as "polarity of a data voltage").

The data driver 500 receives a digital image signal DAT for one row of pixels PX according to the data control signal CONT2 from the signal controller 600, selects a gray voltage from the gray voltage generator 800 corresponding to each digital image signal DAT, thereby converting the digital image signal DAT to an analog data voltage, and then applies the analog data voltage to the corresponding data lines D1-Dm.

The gate driver 400 applies a gate-on voltage Von to the gate lines G1-Gn according to the gate control signal CONT1 from the signal controller 600 to turn on the switching element Q that is connected to the gate lines G1-Gn. Accordingly, a data voltage that is applied to the data lines D1-Dm is applied to the corresponding pixel PX through the turned-on switching element Q.

The difference between the common voltage Vcom applied to the common electrode of the upper panel 200 and the data voltage that is applied to the pixel PX is represented as a charge voltage, i.e., a pixel voltage of the liquid crystal capacitor Clc. Liquid crystal molecules in the liquid crystal layer 3 change their arrangement according to a magnitude of a pixel voltage, so that polarization of light passing through the liquid crystal layer 3 changes. The change in the polarization is represented as a change in transmittance of light by the polarizer, whereby a pixel PX displays luminance displaying a gray of a digital image signal DAT.

By repeating the process with a unit of one horizontal period (referred to as "1H", the same as one period of a horizontal synchronizing signal Hsync and a data enable signal DE), a gate-on voltage Von is sequentially applied to all gate lines G1-Gn and a data voltage is applied to all pixels PX, so that an image of one frame is displayed.

A state of an inversion signal RVS that is applied to the data driver 500 is controlled so that a next frame starts when one frame ends and the polarity of a data voltage that is applied to each pixel PX from the data driver 500 is opposite to the polarity in a previous frame ("frame inversion"). According to characteristics of the inversion signal RVS even within one frame, the polarity of a data voltage flowing through one data line may be periodically changed (e.g. row inversion and dot inversion) or the polarity of the data voltage that is applied to one pixel row may be different from each other (e.g. column inversion and dot inversion).

A structure of the picture quality improvement unit 610 and processing of input image signals R, G, and B according to an exemplary embodiment of the present invention are described hereinafter.

Figure 3:
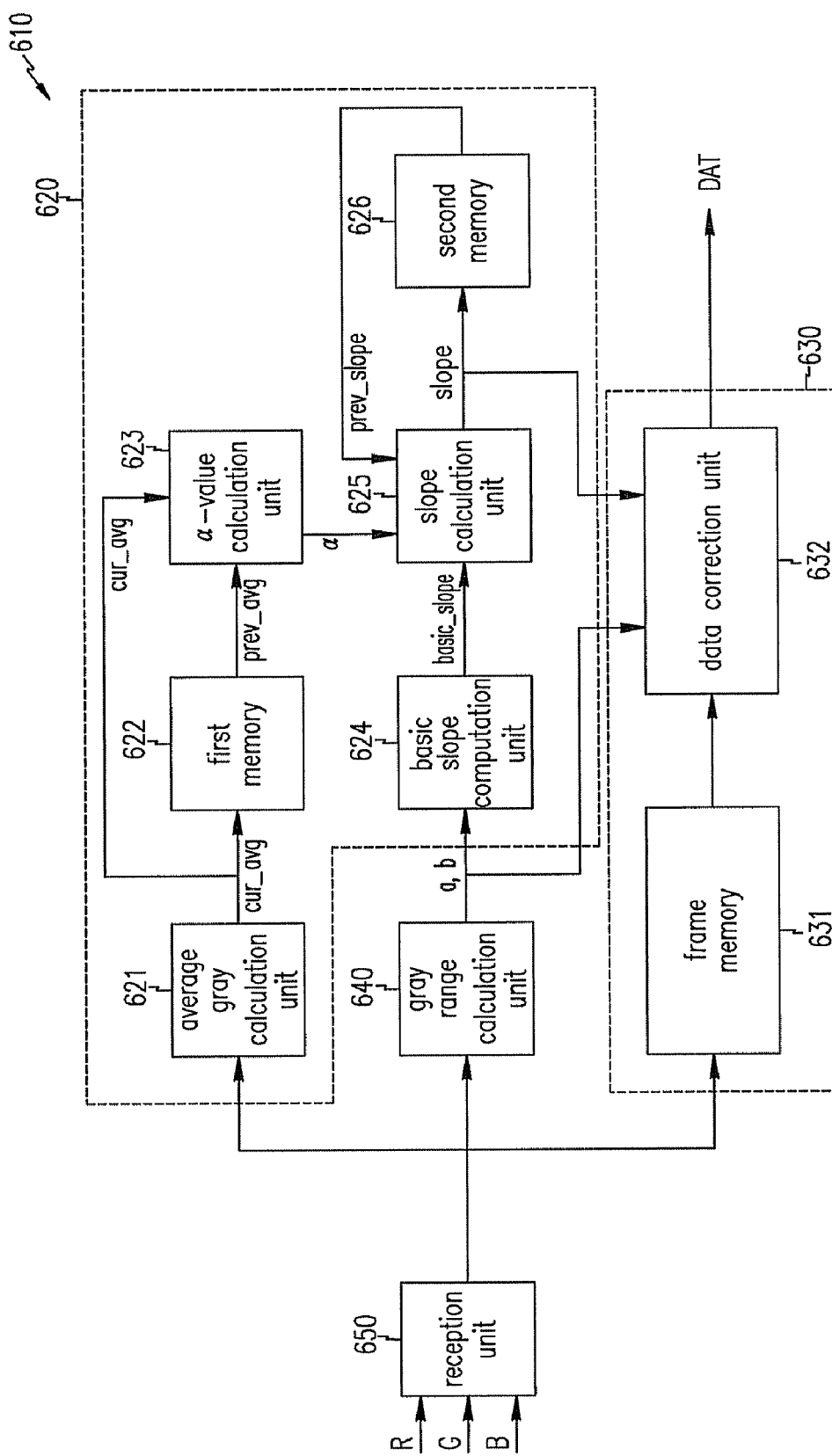
FIG. 3 is a block diagram of an exemplary picture quality improvement unit according to an exemplary embodiment of the present invention.
Figure 4:
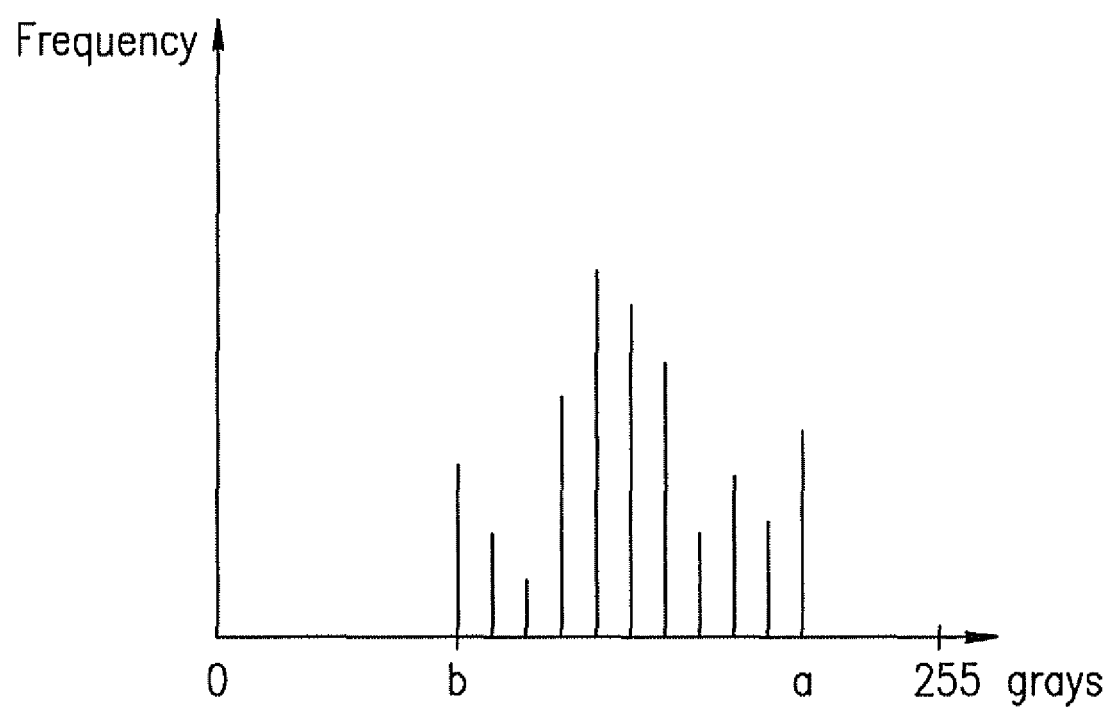
FIG. 4 is a histogram of an image signal of one frame in an exemplary embodiment of the present invention.
Figure 5:
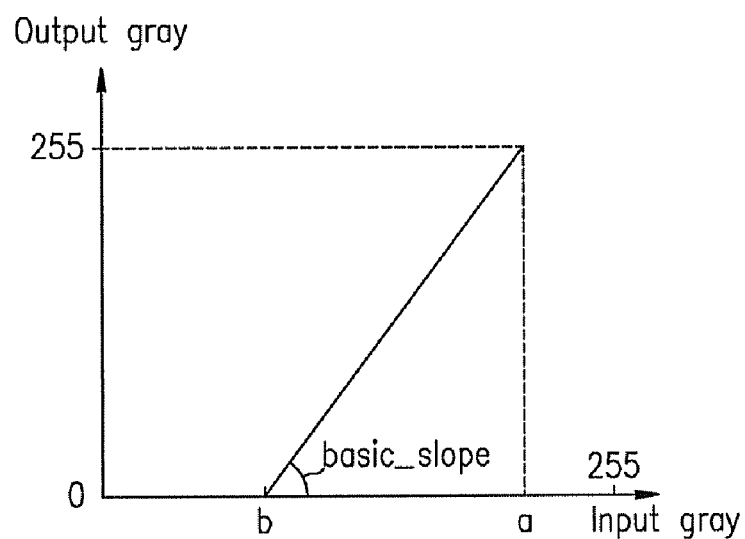
FIG. 5 is a graph illustrating a relationship between an input gray and an output gray in an exemplary embodiment of the present invention.
Figure 6:
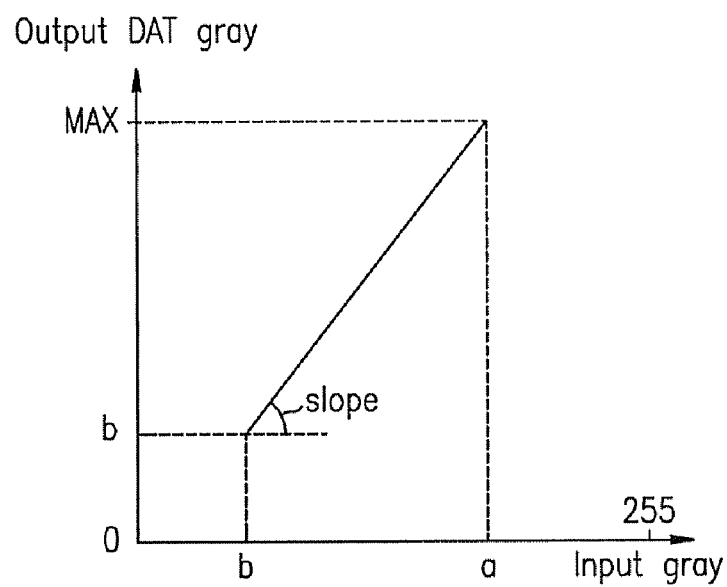
FIG. 6 is a graph illustrating a relationship between a slope of the frame data of FIG. 5 and an output digital image signal DAT and an input gray.

FIG. 3 is a block diagram of an exemplary picture quality improvement unit according to an exemplary embodiment of the present invention, and FIG. 4 is a histogram of an image signal of one frame in an exemplary embodiment of the present invention. FIG. 5 is a graph illustrating a relationship between an input gray and an output gray in an exemplary embodiment of the present invention, and FIG. 6 is a graph illustrating a relationship between an input gray and an output gray in another exemplary embodiment of the present invention.

The picture quality improvement unit 610 according to an exemplary embodiment of the present invention includes a slope calculation unit 620, an output signal generator 630, a gray range calculation unit 640, and a reception unit 650. The picture quality improvement unit 610 converts input image signals R, G, and B according to a conversion variable of an image signal for a frame, and the conversion variable is determined based on a gray minimum value, a gray maximum value, and a gray average of the frame, and a gray average and a conversion variable of a previous frame. Particularly, the conversion is linear conversion, and the conversion variable corresponds to a slope of linear conversion.

The slope calculation unit 620, which also may be referred to as a conversion variable calculation unit, includes an average gray calculation unit 621, a first memory 622, an α-value calculation unit 623, a basic slope computation unit 624, a slope calculation unit 625, and a second memory 626. The output signal generator 630 includes a frame memory 631 and a data correction unit 632.

The reception unit 650 receives input image signals R, G, and B that are input to the picture quality improvement unit 610 and outputs the input image signals R, G, and B to the slope calculation unit 620, the output signal generator 630, and the gray range calculation unit 640.

The gray range calculation unit 640 calculates a minimum value and a maximum value of a gray of the input image signal R, G, B. In more detail, the gray range calculation unit 640 has a storage place for storing a maximum gray value and a minimum gray value, stores a gray of an image signal that is first input in the storage place, then compares input image signals R, G, B that are sequentially input with a value that is stored in the storage place and updates the value. When such a process finishes for an input image signal R, G, B of one frame, a maximum gray value and a minimum gray value of the frame are stored in the storage place of the gray range calculation unit 640.

The minimum gray value and the maximum gray value may be represented with a histogram, as shown in FIG. 4. The histogram is a graph displaying a frequency of each gray of the input image signal R, G, B. In the graph of FIG. 5, the minimum gray value is "b" and the maximum gray value is "a". Hereinafter, a minimum gray value of a gray of an input image signal R, G, B that is calculated in the gray range calculation unit 640 is "b", and a maximum gray value thereof is "a".

The gray range calculation unit 640 provides the calculated minimum value b and maximum value a to the slope calculation unit 620, and the minimum value b is also output to the output signal generator 630.

The average gray calculation unit 621 calculates an average value (hereinafter referred to as a "gray average value cur_avg") of an input image signal R, G, B. For example, when a total number of pixels is n×m, and an input image signal of a pixel PX is $D_{ij}$, the gray average value cur_avg of the input image signal is represented by Equation 1.

$$\text{cur\_avg} = \frac{\sum_{i,j} D_{ij}}{n \times m} \qquad \text{(Equation 1)}$$

The first memory 622 receives the calculated gray average value cur_avg and stores the value up to a next frame. Therefore, if a new gray average value cur_avg is input, the first memory 622 outputs the stored gray average value as a gray average value prev_avg of a previous frame.

The α-value calculation unit 623 calculates an α-value using a gray average value cur_avg of the current frame that is received from the average gray calculation unit 621 and a gray average value prev_avg of a previous frame that is received from the first memory 622. The α-value is defined by Equation 2.

$$\alpha = \left| \frac{\text{cur\_avg} - \text{prev\_avg}}{255} \right| \qquad \text{(Equation 2)}$$

Here, because the number for the denominator is a maximum value of grays that can be displayed and starts from the 0th gray, the number for the denominator is equal to the total gray number minus 1. In Equation 2, in an exemplary embodiment in consideration of 256 grays, the denominator is set to 255. An α-value that is calculated by Equation 2 has a value of 0 to 1. The α-value is a difference between a gray average value cur_avg of a current frame and a gray average value prev_avg of a previous frame and represents an average luminance difference between two frames.

The basic slope computation unit 624 computes a basic slope basic_slope that is defined by Equation 3 using the minimum gray value b and the maximum gray value a.

$$\text{basic\_slope} = \frac{255}{a - b} \qquad \text{(Equation 3)}$$

wherein the number of the numerator is a maximum value of grays that can be displayed, and in the case of 256 grays, the number is 255.

The slope calculation unit 625 computes a slope that is defined by Equation 4 from an α-value provided by the α-value calculation unit 623, a basic slope basic_slope calculated by the basic slope computation unit, and a previous slope prev_slope from second memory 626.

$$\text{slope} = (1-\alpha)\text{prev\_slope} + (\alpha)\text{basic\_slope} \qquad \text{(Equation 4)}$$

wherein a previous slope (prev_slope) is a slope of an image signal of a previous frame and is a value that is stored in the second memory 626.

That is, $$\text{slope} = \left(1 - \left|\frac{\text{cur\_avg} - \text{prev\_avg}}{255}\right|\right) \times \text{prev\_slope} + \left|\frac{\text{cur\_avg} - \text{prev\_avg}}{255}\right| \times \frac{255}{a-b}$$

The slope calculation unit 625 stores the computed slope in the second memory 626, and when computing a slope of an image signal of a next frame, the second memory 626 provides the slope as a slope of a previous frame prev_slope.

The output signal generator 630 includes the frame memory 631 and the data correction unit 632.

The frame memory 631 stores an input image signal R, G, B that is received from the reception unit 650.

The data correction unit 632 linearly converts an input image signal that is received from the frame memory 631 according to a rule that is given by Equation 5 to generate an output digital image signal DAT.

$$DAT = (\text{Frame\_Data} - b)\text{slope} + c \quad \text{(Equation 5)}$$

where c is a constant and has a value of 0 to 255. For example, c may be set to a minimum gray value b.

FIG. 6 is a graph illustrating a relationship of Equation 5 where c=b.

If a gray (hereinafter referred to as an "input gray") of an input image signal is a minimum gray value b, then a gray (hereinafter referred to as an "output gray") of an output image signal DAT is also "b", and as the input gray increases, the output gray also increases according to a slope. If the input gray is a maximum gray value a, the output gray also becomes a maximum value MAX. However, when computing by Equation 5, a maximum value MAX of the output gray can exceed a maximum value, for example 255, of a gray that can be displayed. In this case, a clamping value is set to 255. Because the human eye cannot recognize a difference in luminance greater than a predetermined level, even if clamping is performed, there is no problem in recognizing an image.

In the above description, a constant c of Equation 5 is set to be equal to a minimum gray value b of the input gray in order to set display luminance to be greater than a minimum gray value b.

A slope that is computed by Equation 4 may be smaller than 1. In this case, because a range of the input gray becomes smaller than that of the output gray, contrast is not extended. Therefore, it is preferable that a minimum value of the slope is fixed to 1. A preferable slope is about 2.5 or less, and particularly, when the value of the slope is about 2, an image improvement effect is excellent.

Particularly, when computing a slope, because luminance of a previous frame as well as luminance of a current frame are considered, even when a luminance difference of adjacent frames is large, an image to be displayed is not distorted.

When a display operation is started, in order to process an input image signal R, G, B that is first input, an initial value may be stored in the first memory 622 and the second memory 626. After the display device is turned on, a certain amount of time is required until a normal image is displayed, and by performing data processing in several frames for the time period a stable output image signal can be obtained, and thus an initial value that is stored in the first memory 622 and the second memory 626 may have a random value.

FIG. 5 is a graph illustrating a relationship in which an output gray of a minimum gray value b of an input gray is 0 and an output gray of a maximum gray value a of the input gray is 255, and is shown for comparison.

The signal controller 600 may further perform other signal processes such as dynamic capacitance compensation ("DCC") and adaptive color correction ("ACC") in addition to the signal processing of the picture quality improvement unit 610.

Figures 7, 8:
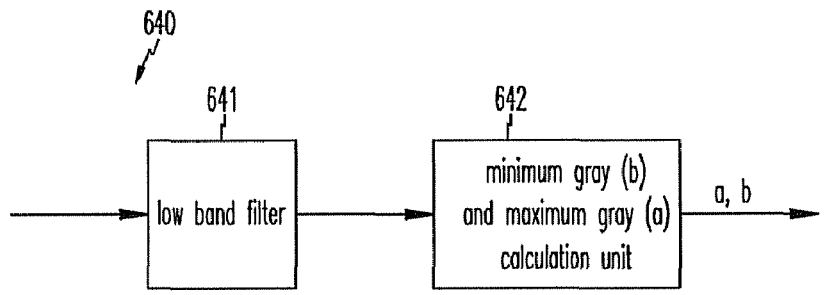
FIG. 7 is a block diagram of an exemplary gray range calculation unit according to an exemplary embodiment of the present invention.
FIG. 8 illustrates an exemplary low band filtration mask according to an exemplary embodiment of the present invention; and, FIG. 9 illustrates a case of applying an exemplary low band filtration mask and an exemplary liquid crystal panel assembly to each pixel according to an exemplary embodiment of the present invention.

Referring to FIGS. 7 to 9, the gray range calculation unit 640 according to an exemplary embodiment of the present invention is described in detail.

FIG. 7 is a block diagram of an exemplary gray range calculation unit according to an exemplary embodiment of the present invention, FIG. 8 illustrates an exemplary low band filtration mask according to an exemplary embodiment of the present invention, and FIG. 9 illustrates a case of applying an exemplary low band filtration mask and an exemplary liquid crystal panel assembly to each pixel according to an exemplary embodiment of the present invention.

The gray range calculation unit 640 according to the present exemplary embodiment includes a low band filter 641, and a minimum gray b and maximum gray a calculation unit 642, as shown in FIG. 7.

The low band filter 641 removes noise existing in an input image signal. When noise is included in the input image signal, a minimum gray value b and a maximum gray value a that are calculated due to noise change, and noise can be clearly displayed, whereby noise is removed using the low band filter 641.

The low band filter 641 includes, for example, a mask 900 as shown in FIG. 8. Divided regions (hereinafter referred to as "division regions") on the mask 900 correspond to pixels PX of the liquid crystal panel assembly 300, and as illustrated in FIG. 8, 7×7 division regions are provided on the mask 900, although alternate numbers of division regions on the mask 900 may be utilized. Further, the mask 900 has a center region o, and a weight (for example, minimum 1/256 and maximum 40/256) is allocated in each division region of the mask 900. As the division regions are positioned further from the center region o the division regions have decreasing weights, and the sum of all weights of the mask 900 is 1.

FIG. 9 shows an application principle of the mask 900. When a mask 900 is applied to an input image signal of a certain pixel the center region o of the mask 900 is arranged to correspond to the certain pixel, a weight of each division region on the mask 900 and an image signal of the pixel corresponding to the division region are multiplied, and then all of the obtained values are added. The resultant value is referred to as a filtration image signal $D'_{ij}$, and is represented by Equation 6.

$$D'_{ij} = \sum_{ij} MK_{ij} \times D_{ij} \quad \text{(Equation 6)}$$

where a $D_{ij}$ value is an input image signal of a pixel, and $MK_{ij}$ is a weight of a division region on the mask 900 corresponding to $D_{ij}$. In a pixel that does not correspond to the division region of the mask 900, $MK_{ij}$ is regarded as 0.

Referring to FIGS. 8 and 9, an example is described.

First, it is assumed that a pixel overlapping with the center o of the mask 900 is a j-th pixel o' of a first row, and gray values of the input image signal $D_{ij}$ of several pixels surrounding the j-th pixel o' are shown in Table 1.

TABLE 1

|  | (j − 3)th column | (j − 2)th column | (j − 1)th column | j-th column | (j + 1)th column | (j + 2)th column | (j + 3)th column |
| --- | --- | --- | --- | --- | --- | --- | --- |
| 1$^{st}$ row | 31 | 34 | 15 | 230 (o') | 12 | 30 | 31 |
| 2$^{nd}$ row | 38 | 21 | 12 | 18 | 23 | 40 | 58 |
| 3$^{rd}$ row | 29 | 6 | 41 | 13 | 41 | 30 | 61 |
| 4$^{th}$ row | 110 | 213 | 130 | 210 | 180 | 130 | 98 |

The filtration image signal $D'_{ij}$ is as follows.

$D'_{ij}$=31×1/256+34×4/256+15×16/256+230×40/256+
12×16/256+30×4/256+31×1/256+38×1/256+21×
4/256+12×16/256+18×16/256+23×16/256+40×4/

256+58×1/256+29×1/256+6×4/256+41×4/256+13×4/256+41×4/256+30×4/256+61×1/256+110×1/256+213×1/256+130×1/256+210×1/256+180×1/256+130×1/256+98×1/256=50.09 (rounding off the numbers to third places)

In this computation example, pixels do not exist in the liquid crystal panel assembly 300 corresponding to a first row to a third row of the mask 900. In this case, an input image signal of each pixel corresponding to the corresponding division regions is regarded as 0 in the computation.

In this computation example, an input gray of a pixel o' corresponding to the center o of the mask 900 is 230. Because the value is much higher than that of surrounding grays, there is a high possibility that the input gray may be noise. In this case, if the input gray passes through the low band filter 641 using the mask 900, a value of the input gray is modified to be equal to the filtration image signal $D'_{ij}$, which in the exemplary embodiment is 50.09, and thus noise disappears, such that the input gray has a similar value to surrounding gray values.

With the above-described method, a filtration image signal $D'_{ij}$ is generated in all pixels.

The minimum gray b and maximum gray a calculation unit 642 calculates and outputs a minimum gray value b and a maximum gray value a of the filtration image signal $D'_{ij}$.

In the exemplary embodiments, an LCD is described. However, the present invention is not limited to the LCD, and can be applied to a display device such as an organic light emitting diode ("OLED") display or a plasma display panel ("PDP").

As described above, using a minimum gray and a maximum gray of an image signal of one frame, a gray average of the corresponding frame, and a gray average of a previous frame, an input image signal is corrected and outputted.

As a result, a gray range of an image signal can be extended, thereby improving visibility. Further, in a case of a motion picture, even when a difference of gray ranges of adjacent frames is large, due to extension of a gray range, an original image is not distorted. In addition, even when noise is included in an input image signal, a gray range can be extended after the noise is removed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A driving apparatus of a display device, the driving apparatus comprising:
a gray range calculation unit which calculates a minimum gray and a maximum gray of a current image signal, which is an image signal of a current frame, or a signal that filters the current image signal with a low band;
a conversion variable calculation unit which calculates a conversion variable based on the minimum gray, the maximum gray, a gray average of a current image signal, and a gray average of a previous image signal, which is an image signal of a previous frame; and
an output signal generator which generates an output image signal by converting the current image signal according to the conversion variable,
wherein conversion is linear conversion that uses the conversion variable as a slope, and
wherein the slope Sc is given by $$Sc = \left(1 - \left|\frac{AGc - AGp}{Gmax}\right|\right) \times Sp + \left|\frac{AGc - AGp}{Gmax}\right| \times \frac{Gmax}{Max - Min},$$

where AGc is a gray average of a current frame, AGp is a gray average of a previous frame, Gmax is a maximum gray that can be displayed, Sp is a slope of the previous frame, Max is a gray maximum value of the current frame, and Min is a gray minimum value of the current frame.

2. The driving apparatus of a display device of claim 1, wherein the slope Sc has a value of about 1 to about 2.5.

3. The driving apparatus of a display device of claim 1, wherein the conversion is defined by D'=(D−Min)Sc+c, where D is a current image signal, D' is an output image signal, and c is a constant.

4. The driving apparatus of a display device of claim 3, wherein the constant c is identical to the gray minimum value of the current frame Min.

5. The driving apparatus of a display device of claim 1, wherein the conversion variable calculation unit comprises:
an average gray calculation unit which calculates a gray average of an image signal;
a first memory which stores the gray average calculated by the average gray calculation unit;
an α-value calculation unit which calculates an α-value by dividing a difference between a gray average of the current image signal and a gray average of the previous frame by a maximum gray value that can be displayed;
a basic slope computation unit which computes a basic slope in which a maximum gray that can be displayed is divided by a difference between the maximum gray and the minimum gray;
a slope computation unit which computes the basic slope, a slope of the previous image signal, and a slope of the current image signal based on the α-value; and
a second memory which stores a slope that is computed in the slope computation unit and provides a slope of the previous image signal to the slope computation unit.

6. The driving apparatus of a display device of claim 5, wherein the output signal generator comprises:
a frame memory which stores the current image signal; and
a data correction unit which generates the output image signal by linearly converting the current image signal that is received from the frame memory according to the slope that is received from the slope computation unit.

7. The driving apparatus of a display device of claim 6, wherein the gray range calculation unit comprises:
a low band filter which removes noise by filtering the current image signal with a low band; and
a minimum gray and maximum gray calculation unit which calculates the minimum gray and the maximum gray of the current image signal that passes through the low band filter.

8. The driving apparatus of a display device of claim 7, wherein the low band filter corrects a current image signal of each pixel by providing and adding a predetermined weight to a current image signal of a pixel adjacent to the current image signal of each pixel.

9. The driving apparatus of a display device of claim 1, wherein low band filtration comprises correcting a current image signal of each pixel in consideration of a current image signal of adjacent pixels.

10. A method of driving a display device, the method comprising:

calculating a minimum gray and a maximum gray of a current image signal, which is an image signal of a current frame;

calculating a gray average of the current image signal;

calculating a slope based on the minimum gray, the maximum gray, the gray average of a current image signal, and a gray average of a previous image signal, which is an image signal of a previous frame; and linearly converting the current image signal based on the slope, wherein the slope Sc is given by $$Sc = \left(1 - \left|\frac{AGc - AGp}{Gmax}\right|\right) \times Sp + \left|\frac{AGc - AGp}{Gmax}\right| \times \frac{Gmax}{Max - Min},$$

where AGc is the gray average of the current frame, AGp is the gray average of the previous frame, Gmax is a maximum gray that can be displayed, Sp is the slope of the previous image signal, Max is the maximum gray of the current frame, and Min is the minimum gray of the current frame.

11. The method of claim 10, wherein linearly converting satisfies D'=(D−min)Sc+c, where D is the current image signal, D' is an output image signal, min is the minimum gray, and c is a constant.

12. The method of claim 11, wherein the constant c is identical to the minimum gray min.

13. The method of claim 10, further comprising removing noise existing in the current image signal before calculating the minimum gray and the maximum gray.

14. The method of claim 13, wherein removing noise comprises removing noise of each current image signal by providing and adding a weight to an image signal adjacent to the each current image signal.

15. A display device comprising:

a signal controller which generates an output image signal by correcting a current image signal, which is an image signal of a current frame, based on a gray average, a minimum gray, and a maximum gray of the current image signal, and a gray average of a previous image signal, which is an image signal of a previous frame;

a data driver which converts the output image signal to a data voltage; and a display panel which receives the data voltage to display an image, wherein the signal controller linearly converts the current image signal to the output image signal based on a slope Sc that is calculated based on the minimum gray, the maximum gray, the gray average of the current image signal, and the gray average of the previous image signal, and wherein the slope Sc is given by $$Sc = \left(1 - \left|\frac{AGc - AGp}{Gmax}\right|\right) \times Sp + \left|\frac{AGc - AGp}{Gmax}\right| \times \frac{Gmax}{Max - Min},$$

where AGc is the gray average of the current frame, AGp is the gray average of the previous frame, Gmax is a maximum gray that can be displayed, Sp is the slope of the previous image signal, Max is the maximum gray of the current frame, and Min is the minimum gray of the current frame.

16. The display device of claim 15, wherein conversion is defined by D'=(D−min)Sc+min, where D is the current image signal and D' is the output image signal.

* * * * *